United States Patent Office 3,127,377
Patented Mar. 31, 1964

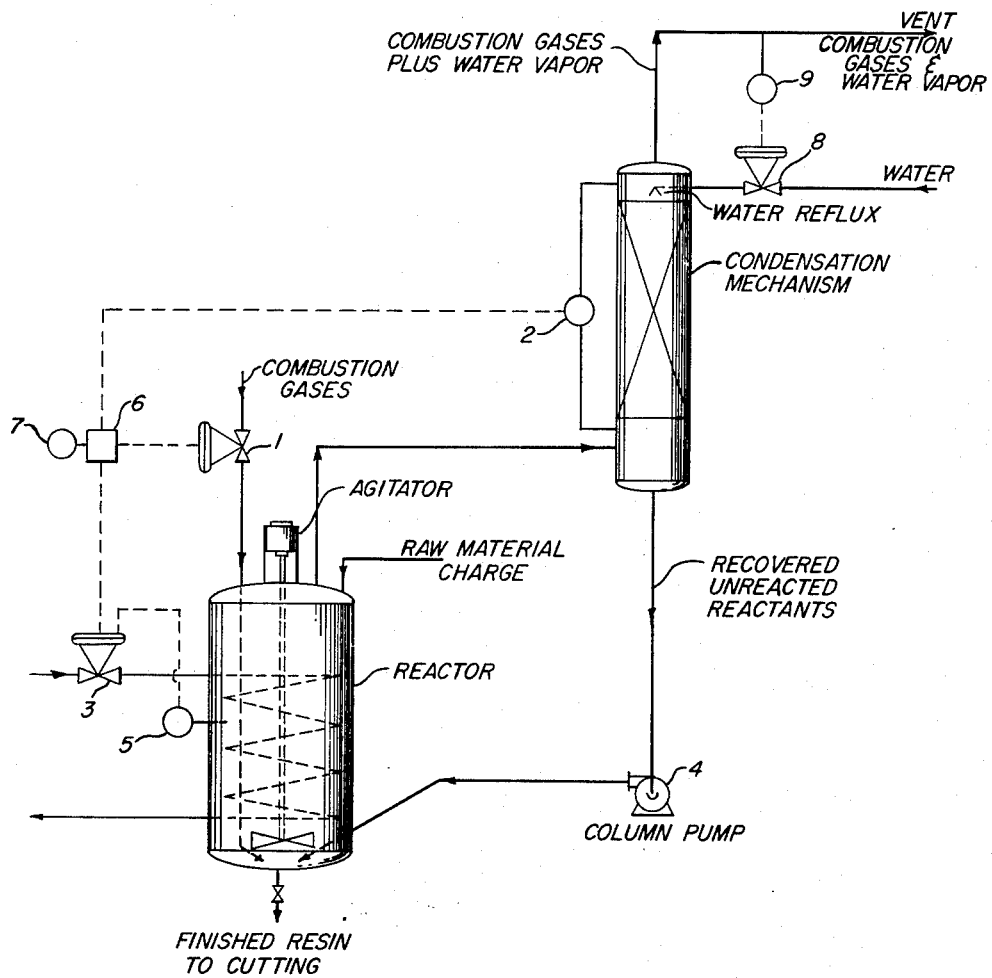

3,127,377
PROCESS FOR PRODUCING POLYESTER RESINS USING COMBUSTION GASES TO MAINTAIN AN ELEVATED BOIL-UP RATE
Abraham Lindenauer, Wallingford, Conn., assignor to American Cyanamid Company, New York, N.Y., a corporation of Maine
Filed Aug. 17, 1961, Ser. No. 132,049
7 Claims. (Cl. 260—75)

This invention relates to a novel process for preparing polyester resins. Furthermore, this invention relates to the use of the combustion product of natural gas, methane, or other combustible material, to give an inert gas substantially free of oxygen for use as an inert stripping agent in polyester processing. Still further, this invention relates to a novel process for producing polyester resins with greatly reduced esterification times and losses of volatile reactants. The use of this process will also enable production of resins with highly reproducible properties attributed to the ease of control of reaction conditions. This invention further relates to a process whereby the desired boil-up rate is continuously and automatically maintained throughout the reaction cycle by sparging the reactants with the combustion product of methane introduced below the surface of the reaction mass, when and as required. The vapors leaving the reaction sphere are passed through a distillation column which is automatically controlled so that the volatile reactants are recovered and returned to the reaction sphere, while the combustion gases and water of reaction are removed from the system and the condensed water returned as a reflux.

One of the objects of the present invention is to produce polyester resin compositions by a novel process in which polyhydric alcohol losses are significantly reduced.

A further object of the present invention is to produce polyester resin compositions in which the esterification kettle time is also appreciably reduced.

A further object of this invention is to make full use of the system's capacity to expel water of reaction during that part of the reaction when free boiling exists, and to determine automatically when the addition of the sparge of the combustion gases is required to maintain the desired boil-up rate. These and other objects of the present invention will be discussed in greater detail hereinbelow.

A standard procedure in polyester resin processing is to use a constant inert gas sparge throughout the reaction cycle. The inert gas serves to strip out water of reaction and to maintain a relatively oxygen-free atmosphere above the reaction mass. If the water of reaction is not removed as it is formed, the esterification reaction will be prohibitively long, due to the reversible nature of the reaction. The presence of small quantities of free oxygen in the reaction sphere will cause discoloration of the polyester due to oxidation. General practice is to use an inert gas sparge rate equivalent to about 10% of the reactor content volume per minute, in cubic feet. By practicing the process of the present invention, one withholds the combustion gas sparge necessary for water removal until it is required and as a consequence the volatile reaction losses from the distillation column are held to a minimum and kettle time is substantially reduced.

Polyester resins have as a general class a plurality of applications in industry. Unsaturated polyester resins such as those prepared by reacting a glycol with an alpha, beta-ethylenically unsaturated dicarboxylic acid are useful in the field of laminating resins. Alkyd resins, on the other hand, such as those produced by reacting a polyhydric alcohol with a polycarboxylic acid free of nonbenzenoid unsaturation, whether oil-modified or not, have utility in the field of coating compositions such as primers, flat wall paints, enamels, and the like. Regardless of the ultimate end use of these polyester resins, the initial processing is substantially the same, namely, the reaction of a polycarboxylic acid with a polyhydric alcohol at esterification temperatures, namely, above about 150° C. which results in the formation of water of esterification which needs to be removed from the esterification sphere in order that the polyester resin formation can proceed. In the production of polyester resins, the reaction tends to be at least in part a reversible one in which the esterification goes forward and produces the water of esterification and thereafter hydrolysis tends to set in breaking down the esterification product to its starting materials. It is then desirable to remove the water of esterification from the reaction vessel by an expeditious approach but it has been found that in the past the removal of said water results in the removal of small but significant quantities of unreacted reactants, namely, the polyhydric alcohol and/or the polycarboxylic acid. It is unquestionably desirable to remove the water of esterification but such removal carries with it the necessary evil of removing these unreacted reactants which may become lost to the process and, as a consequence, add to the cost of production of these polyester resins. I have found that by passing the combustion product of methane through the reacting reactants that I can remove the water of esterification and although additionally remove small quantities of the unreacted reactants, I am able to separate the water and combustion gases from the reactants in a condensation mechanism followed by the subsequent separation of water vapor from the combustion gases, condensation of the water vapor, return of the liquid water to the top of the distillation column as reflux and returning the condensed reactants to the reaction sphere. Furthermore, I have found that the use of an inert gas weeping agent is of no appreciable benefit for removing water of reaction formed during early stages of an esterification reaction. During the early stages of the reaction the water will be removed due to free boiling of volatile reactants. I have also found that greatly reduced reaction cycle times are attained if throughout the reaction cycle there is maintained a vapor rate (henceforth called boil-up rate) leaving the reaction mass equivalent to 3 to 7 times the normal inert gas rate, and preferably 5 times. Furthermore, I have found that this high boil-up rate can be maintained during the early stages of the esterification by evolution of volatile reactants plus water of reaction only and the use of an inert sweeping agent at that time is not required. During that stage of the reaction when the concentration of free volatile reactants and the rate of water formation has been reduced to a level where the desired boil-up rate cannot be maintained, the reaction mass is sparged with the combustion gases to keep the boil-up rate at the desired level. The reduction in reaction cycle times is undoubtedly due to the increased agitation and speed of water removal caused by the relatively high boil-up rate throughout the reaction.

The process of the present invention can be applied to esterification reactions that are relatively rapid due to the high solubility of the carboxylic compound in the alcohol, such as phthalic anhydride in propylene glycol; as well as to esterifications that are lengthy due to the relative insolubility of the carboxylic compound in the alcohol such as isophthalic acid in propylene glycol.

The resinous materials prepared in the process of the present invention are identified generically as polyester resinous materials which result from the esterification of a polyhydric alcohol and a polycarboxylic acid. Although there are a substantial number of different kinds of these polyester resins, there are two principal commercial polyester resins to which the instant process is immediately applicable. One of these polyester resins is identified generally as an unsaturated polyester resin inasmuch as said resin is prepared by reacting a polyhydric alcohol and preferably a dihydric alcohol with an alpha, beta-ethylenically unsaturated polycarboxylic acid and preferably an alpha, beta-ethylenically unsaturated dicarboxylic acid. The second category of commercially available resinous materials to which the instant process would be applicable are the glyceride oil-modified alkyl resins. Each of these classes of resins will be discussed in greater detail hereinbelow. The unsaturated polyester resins produced in the present invention are subsequently blended with a polymerizable monomer and upon proper catalysis are converted to a thermoset condition into such useful materials as laminates, and the like. The glyceride oil-modified alkyl resins, on the other hand, are frequently styrenated in the presence of an inert solvent to produce coating compositions such as baking enamels, and the like.

In order to achieve substantially complete esterification of the polycarboxylic acid with the polyhydric alcohol, heating is continued at elevated temperatures in the range of about 150° C. to 320° C. and preferably from about 190° C. to 220° C. for unsaturated polyesters and from about 190° C. to about 260° C. for alkyd resins until a relatively low acid number is achieved. There is no significant criticality in the acid number although generally it is desired to continue the reaction until the acid number is dropped below 100 and preferably below 65. In the instance of unsaturated polyester resins, in which there is used an alpha, beta-ethylenically unsaturated dicarboxylic acid it is frequently conventional in certain instances to continue the esterification reaction until the acid number has dropped below 10. To accomplish this, it is ordinarily desired to utilize the polyhydric alcohol in an amount calculated, on a stoichiometrical basis, to be sufficient, and preferably in excess by 10% to 30% of the amount required, to completely esterify the acid component or components. Normal operation requires the large excess of alcohols but the present invention permits the use of less than said excesses to accomplish substantially the same results.

In the preparation of the polyester resins of the present invention, one may utilize any of the polyhydric alcohols such as ethylene glycol, propylene glycol, diethylene glycol, dipropylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, or the alkane diols such as butanediol-1,4, pentanediol-1,5, hexanediol-1,6, and the like. These polyhydric alcohols may be used either singly or in combination with one another. In the preparation of unsaturated polyester resin compositions where use is made of an alpha, beta-ethylenically unsaturated dicarboxylic acid, it is generally preferred that the polyhydric alcohol used be predominantly a dihydric alcohol although minor amounts up to about 10 to 25% of higher hydric alcohols such as trihydric, tetrahydric, hexahydric alcohols may be used. In the unsaturated polyester resins, it is generally desired that there be produced a linear polyester resin with polymerizable sites available for cross-linking with the polymerizably reactive monomer. For the purpose of making unsaturated polyester resins, then it can be seen that the diols, and more particularly the glycols, are preferred. When the blend of dihydric alcohol with a polyhydric alcohol having more than two hydroxy groups are utilized, the average functionally of the alcohols used should not be significantly above about 2.25. In the preparation of alkyd resins including oil-modified alkyd resins, it is generally desired to utilize polyhydric alcohols having the functionality of 3 or more although dihydric alcohols may be used in combination with those polyhydric alcohols having three or more hydroxy groups. In making such an alkyd resin, the average functionality of the alcohols used should not be appreciably below about 2.75.

In the preparation of the polyester resins used in the process of the present invention whether they be unsaturated polyester resins or alkyd resins, one may utilize such polycarboxylic acids as those polycarboxylic acids which are free of nonbenzenoid unsaturation including phthalic acid, isophthalic acid, oxalic acid, malonic acid, succinic acid, glutaric acid, sebacic acid, adipic acid, pimelic acid, suberic acid, azelaic acid, tricarballylic acid, citric acid, tartaric acid, malic acid and the like. Obviously, these acids may be used either singly or in combination with one another and the anhydrides of said acids, whenever available, may be used either singly or in combination with one another or in combination with the acids. Among the alpha, beta-ethylenically unsaturated polycarboxylic acids which may be used in the practice of the process of the present invention are maleic acid, fumaric acid, aconitic acid, itaconic acid, chloromaleic acid, and the like. The anhydrides of these acids may be used, whenever available. These acids and/or their anhydrides may be used either singly or in combination with one another. In the preparation of alkyd resins, it is generally conventional to utilize a polycarboxylic acid which is free of nonbenzenoid unsaturation although minor amounts of alpha-beta-ethylenically unsaturated polycarboxylic acids may be used. Ordinarily, the polycarboxylic acid free of nonbenzenoid unsaturation is used exclusively in the preparation of alkyd resins whether oil-modified of not, but up to about 10% on a mol basis of an alpha, beta-ethylenically unsaturated acid may be used, based on the total mols of polycarboxylic acid used, in alkyd resins. In the unsaturated polyester resins, it is desirable to utilize the alpha-beta-ethylenically unsaturated acids in an amount approximating at least 20% by weight of the total weight of the polycarboxylic acids used and preferably in amounts varying between about 25% and 65% by weight based on the total weight of polycarboxylic acid used, the balance being polycarboxylic acids free of nonbenzenoid unsaturation.

In the manufacture of oil-modified alkyl resins, it is conventional to use any of the glyceride oils or the fatty acids of glyceride oils or their mono-glycerides. Among the glyceride oils which may be used in the production of the oil-modified alkyd resins are coconut oil, palm oil, babassu oil, murumuru oil, rape seed oil, mustard oil, olive oil, peanut oil, sesame oil, corn oil, cotton seed oil, soya oil, sunflower oil, walnut oil, linseed oil, perilla oil, castor oil, either raw or dehydrated, tung oil, citicica oil, whale oil, menhaden oil, sardine oil, herring oil, and the like. Among the fatty acids derived from such oils which may be used in the manufacture of oil-modified alkyd resins are caproic acid, caprylic acid, capric acid, lauric acid, myristic acid, palmitic acid, stearic acid, arachidic acid, behenic acid, lignoceric acid, and the like. Certain unsaturated monocarboxylic acids derived from glyceride oils are utilized conventionally including myristoleic acid, palmitoleic acid, oleic acid, linolenic acid, linoleic acid, elaeostearic acid, licanic acid, ricinoleic acid, erucic acid, and the like. As these fatty acids are derived from these glyceride oils, they frequently occur in admixture with one another. The fatty acid component derived from tall oil may also be utilized in the manufacture of alkyd resins. This tall oil fraction is generally distilled one or more times in order to remove the rosin acid component, unsaponifiable materials, ash, and the like. The amount of oil utilized in the manufacture of oil-modified alkyd resins can be varied very considerably from short oil to medium oil or long oil classifications and may be non-drying, semi-drying or drying oils. These classifications are all well known in the art and further delineation of detail relating thereto is deemed to be unnecessary. Reference is made, however, to the publication "Organic Coating Technology," volume 1, by Henry Fleming Payne, published by John Wiley & Sons, Inc., in 1954. Attention is directed particularly to page 280, among other pertinent parts of the disclosure.

In these esterification reactions, no catalyst is necessary as the esterification proceeds quite smoothly without use thereof. However, if one wished to make use of an esterification catalyst, there are a number of the same readily available in the art which would find application for this purpose.

When the reaction between the polyhydric alcohol and the polycarboxylic acid has begun in the reaction vessel, the polyhydric alcohol, being generally more volatile than the polycarboxylic acid, tends to vaporize when and as the temperature of reaction reaches its maximum esterification temperature. As the polyhydric alcohol volatilizes it begins to leave the reaction vessel at a certain vapor rate. This is particularly true when the polyhydric alcohol is one of the lower boiling glycols such as ethylene glycol, propylene glycol, diethylene glycol, trimethylene glycol, butanediol-1,3, butanediol-2,3 and the like. The normal boil-up rate at the beginning of the esterification reaction is controlled to approximately 30% to 70% of the reactive volume per minute in cubic feet. When this vapor rate or boil-up rate begins to decrease while under full heat, the reactants in the vessel are sparged with combustion gases as described hereinabove and more fully hereinbelow. This sparging is accomplished automatically, continuously and almost instantaneously, initiating at the vapor rate drop so as to inhibit the vapor rate decline. As the vapor rate, due to the volatized reactants and more particularly the glycols plus water of reaction diminishes, the sparge of the combustion gases increases at least proportionately so as to maintain a total vapor rate due to the volatilized reactants plus combustion gases and water at a substantially steady rate at full heat. The unreacted reactants, water of esterification and the combustion gases leaving the top of the reaction vessel will be passed through a distillation column in which the reactants are condensed out, the combustion gases and the water of esterification are removed from the top of the distillation column, the water vapor condensed and the combustion gases are vented to the atmosphere while the water is refluxed back through the top of the column. The condenser on the distillation column is not a necessity. The column overhead (steam and inert gas) can be vented to the atmosphere. The sparging is continued, with constant heating, until the desired acid number is reached. Thereupon the sparging is stopped and the reactants heated further to remove any entrapped combustion gases present in the reaction vessel.

The combustion gases used in the present invention are the gaseous products produced by the incomplete burning of methane or marsh gas. Natural gas which is composed substantially of methane is available for this purpose in an almost unlimited supply and at reasonable costs. Other gases may be used such as ethane and propane which when burned would yield substantially the same combustion gases but as starting materials are more expensive and not available in such significant amounts. In the burning of marsh gas to produce combustion gases for use in the practice of the process of the present invention, care must be exercised to make certain that the ultimate product produced is substantially free of molecular oxygen inasmuch as free oxygen in the combustion gases may well have an adverse affect on the color of the polyester resin ultimately produced. As a consequence, the methane is burned in air in amounts of the latter controlled sufficiently so that a product is produced which is slightly less than the complete combustion product of the methane and therefore substantially free of oxygen. The amount of combustion gases passed through the reactants in the reaction vessel can be varied above the normal boil-up rate, 3 times normal boil-up rate or 7 times normal boil-up rate or even higher.

When a polyhydric alcohol and a polycarboxylic acid are introduced into a suitable reaction vessel and heated to the temperature at which polyester resin formation is accomplished, said temperature will vary considerably depending upon the particular reactants utilized. In some instances, this temperature is reached at about 150° C. whereas in other instances, the esterification reaction begins to proceed rapidly at temperatures above 175° C. such as 185° C. and higher. This point in the reaction course can readily be observed by noticing a rapid evolution of water. Prior to this rapid evolution of water, there is doubtlessly being formed some significant measure of monoester. One can determine from experience at what temperature the rapid evolution of water will take place for a set of given reactants. In introducing the combustion gases into the reaction kettle, it is preferable to introduce them into the resin kettle at a point just beneath the agitator.

Reference is made to the accompanying drawing which is a simplified flow diagram and is virtually self-explanatory. The resin kettle is equipped with a stirrer, heating unit, reactants inlet opening and an inlet tube for the introduction of the combustion gases. Optionally the vessel may be equipped with a further inlet, also below the liquid level of the reactants in the vessel for recycling condensed unreacted reactants into the reaction sphere. Substantially at the top of the reaction vessel is an outlet tube through which the vapors of the reactants, the water of esterification and the combustion gases may pass upwardly and into the distillation column which may or may not be packed conventionally. The upper end of the distillation column is controlled and maintained at a temperature at about or just above the atmospheric boiling point of water. The water vapor is removed from the distillation column, condensed and refluxed down into the distillation column. More specifically, the process of the present invention will be carried out as follows using the apparatus shown in the accompanying drawing. Polyhydric alcohols and polycarboxylic acids are charged into the reactor. A small flow of combustion gas is introduced into the reactor by setting control valve 1. The combustion gas is used to sweep out oxygen from the reaction sphere while the reactants are brought up to full heat. The agitator is started. Vapor flow controller 2 which can be any one of the available flow sensing-controlling devices available, but preferably one based on flow related to pressure drop across the distillation column is set to maintain a vapor flow rate equivalent to five times the normal combustion gas rate. Flow controller 2 sensing essentially no vapor flow during the period of reactants heat-up, will activate the heat input valve 3 fully. Valve 3 will remain fully open until a temperature of 150° C. to 185° C., depending on the reactants utilized, is reached. At this temperature the exothermic esterification reaction is underway with copious amounts of water and volatile reactants being released. The flow controller 2 will sense this vapor flow and will start regulating heat-input valve 3 to maintain the desired boil-up rate. The vapor flow controller 2 can be connected to a coolant source for the reactor (not shown) and cooling medium, if required can be introduced to control the exothermic heat liberation. As the esterification proceeds, the exotherm is passed and the volatile reactants are being consumed by the reaction. Due to the formation of esters, the boiling point of the mass is continually rising. To maintain the desired boil-up rate, the vapor flow controller 2 will be required to continually open heat-input control valve 3. At a temperature of 170° C. to 210° C. depending on the raw materials utilized, the concentration of free volatile reactants in the reaction mass is too low to maintain the desired boil-up rate, and heat-input valve will open fully. At this time, an override on flow controller 2 will switch its point of control from heat-input valve 3 to controlling combustion gases addition into the reaction mass through the valve 1, by regulating the combustion gases control valve 1. Control of heat-input valve 3 is simultaneously and automatically switched to reactor temperature controller 5. Temperature controller 5 is set to hold the reaction mass at the desired top heat temperature in the range of 190° C. to 220° C. for unsaturated polyesters, and will keep heat input control valve 3 fully open until the desired temperature is attained.

The override 6 on flow controller 2 is prevented from operating prematurely by adding the time delay 7, as indicated on drawing, or any other available control device that will accomplish the same result. During initial reactant heating, heat-input valve 3 will be opened fully. When the reactants are up to reaction temperature and the vapor flow controller 2 senses increasing vapor flows, it will regulate heat-input valve 3. As the volatile reactants are consumed, it will be necessary for flow controller 2 to open heat-input valve 3 to maintain the desired boil-up rate. When heat-input valve 3 is open fully during this stage of the cycle (not during initial reactant heat-up) the override is allowed to switch control of vapor flow by 2 from heat-input control valve 3 to combustion gas control valve 1. Control of heat-input control valve 3 is automatically switched to reactor temperature controller 5.

The desired boil-up rate is now maintained by the sparging of combustion gases into the reaction mass and is controlled by vapor flow controller 2 regulating combustion gases control valve 1. The quantity of combustion gases sparged will automatically and continuously increase as the volatile reactants are continuously stripped from the reaction mass.

The vapors leaving the reactor are put into the lower portion of a distillation column. Into the top portion of the distillation column flows a controlled quantity of condensed water vapor, called reflux, which passes down part way through the column. When this reflux comes into contact wtih the vaporous volatile reactants and vaporized water of reaction from the reactor, the water reflux is vaporized by condensing the higher boiling volatile reactants. Essentially all the vaporous water of reaction that enters the column with the volatile reactants remains as a vapor and is discharged from the top of the column with the combustion gases. The water leaving the distillation column is condensed and the combustion gases vented to the atmosphere. The water is returned to the top of the distillation column as reflux, as required.

The flow of water reflux (added to the upper portion of the distillation column) is controlled by vapor temperature leaving the column. Temperature controller 9 is set to control the flow of water reflux to the column by controlling reflux control valve 8. The control temperature desired is in the range 1° C. to 3° C. above the boiling point of the water. In this way volatile reactants are condensed in the column and water is removed from the reaction system. Toward the end of the reaction the vapors entering the column will consist mainly of inert gas and water. By maintaining a temperature above the boiling point of water on the vapor leaving the column, insures that the column will be free of liquid water which would flow to the reaction sphere.

The column bottoms will be continuously removed and recycled to the reactor. This stream can be put directly back to the reaction sphere as a liquid.

When the desired specifications of the polyester are attained, the combustion gas sparge and reflux are discontinued. When gas stripping is completed, the heat input to the reactor is shut off and the polyester may then be removed from the reactor for further processing if required.

The distillation column used in the process of the present invention may be any one of a plurality of different but conventional distillation columns. One may utilize a conventional condenser containing packing such as raschig rings in order to obtain the more efficient liquid-gas contacts with a temperature gardient running from about 165° C.–190° C. at the bottom of the column to about 100–103° C. at the top of the column where the condensed water vapor is refluxed back into said top of the column. The volatiles including the vaporized polyhydric alcohols are introduced into the bottom part of the column but above the liquid level in the bottom of the column containing condensed reactants which are permitted by gravity flow or by pumping to return to the reactor. If desired, one could utilize a distillation column with two separate packed sections, the lower of which is designed to function as a stripping section whereas the upper packed section is designed to function as a rectifying section. The volatiles are introduced into the column in the area between the stripping and rectifying sections. This distillation column may optionally be equipped with a heating unit which is placed in the reservoir at the base of the column, which heating unit is controlled to maintain the polyhydric alcohol in the reservoir at its boiling point. Since the boiling point of the polyhydric alcohol is above the boiling point of water, any water that makes its way down to the reservoir is quickly flashed off and an up the column. The heat-input to the liquid reservoir is controlled by the temperature in the stripping section set to maintain a temperature of 3° C. to 5° C. below the boiling point of the polyhydric alcohol. Because of the temperature gradient across the column running from bottom to top, substantially none of the polyhydric alcohol is permitted to leave the column top and therefore losses in this regard are held to a minimum. Further, due to the temperature gradient, a minimum of water is returned to the reaction sphere from the column bottom.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example I*

This example will illustrate the concept of the present invention as applied to the processing of a general purpose polyester resin.

Into a suitable reaction vessel, equipped as shown in the accompanying drawing, there is introduced 1610 parts of 99.5% propylene glycol, 1480 parts of phthalic anhydride and 980 parts of maleic anhydride. A low inert gas flow and agitator are started. The vapor flow controller 2 is set to give a vapor rate equivalent to 50% of the reactor volume contents per minute, in cubic feet. The reactor temperature controller 5 is set to maintain a temperature of 210° C.

The vapor flow controller 2 sensing very little vapor flow will open the heat-input control valve 3 fully. The charge is heated to 100° C. where the exothermic reaction liberates enough heat to quickly raise the temperature of the reaction mass to about 150° C. At about 150° C. copious amounts of water and volatile reactant vapors are liberated. The vapor flow controller 2 sensing the increasing vapor flow, automatically closes the inert gas control valve 1 and starts to throttle heat-input control valve 3 to maintain the boil-up rate at the desired level. As the exothermic heat liberation diminishes, the boil-up rate is maintained by heat-input control valve 3 being opened by flow controller 2. At about 170° C. a major part of the volatile reacants has been consumed and in order to maintain the desired boil-up rate, heat-input valve 3 has been opened fully. When the boil-up rate begins to decline, due to the depletion of volatile reactants, the flow controller 2 will sense the vapor rate fall-off, and the vapor flow controller override 6 will switch from controlling heat-input valve 3 to controlling combustion gases sparging control valve 1. The control of heat-input valve 3 will be put on reactor temperature controller 5. The temperature controller 5 set at 210° C. will keep heat-input valve 3 open fully until this temperature is reached and will then regulate 3 to maintain 210° C.

The desired boil-up rate will now be maintained by controlling the flow of combustion gases with control valve passing the gases into the reaction mass in that area below the agitator. The quantity of combustion gases thus sparged will increase as the quantity of volatile reactants and water of reaction vapors decreases. When the reaction mass reaches and is maintained at 210° C. the boil-up from the reactor will consist mainly of combustion gases plus small amounts of water and volatile reactants.

The vapors from the reaction sphere are introduced into the lower portion of the distillation column. The volatile reactants are condensed on contact with lower boiling liquid water, put into the column top as reflux. The condensed volatile reactants are recycled back to the reactor from the column bottom through the column pump 4.

The flow of water reflux is controlled by reflux control valve 8 activated by column vapor temperature controller 9. The column vapor temperature controller is set to maintain a temperature of 103° C. The liquid water reflux condenses the higher boiling volatile reactants entering the lower portion of the distillation column, and in so doing is vaporized. The water vapors leaving the column top can be condensed, and thus separated from the combustion gases which are vented to the atmosphere.

The reaction mass is maintained at 210° C. until the polyester is completed (indicated by an acid number of less than 65). The water reflux and sparge is discontinued. Heat-input to the reactor is discontinued and the polyester is ready for further processing, if required.

The above general purpose resin was made with a 5% molar excess of propylene glycol in a total reaction cycle time, heat on to heat off, of 6 hours. Using ordinary inert gas cooking procedures, i.e., stripping water of reaction with standard flow of inert gas, a 10% molar excess of propylene glycol would be required to obtain a polyester with similar physical properties, and a heat on to heat off time of 15 hours would be needed.

*Example II*

This example will illustrate the concept of the present invention as applied to the processing of a polyester resin made with relatively insoluble isophthalic acid. When processing isophthalic acid-maleic anhydride based resins, the isophthalic acid is pre-esterified, and then the maleic anhydride is added for a final esterification step.

Into a suitable reaction vessel there is to be charged 1623 parts of 99.5% propylene glycol, 2240 parts of isophthalic acid and 657 parts of maleic anhydride. Both the low inert gas rate required for oxygen purging and the boil-up rate control will be based on the volume of total reactants.

The propylene glycol and isophthalic acid are charged to the reactor. A low flow of inert gas is set. The vapor flow controller 2 is set to maintain a reactor boil-up rate equivalent to 50% of the reactant volume per minute, in cubic feet. The reactor temperature controller is set to 215° C.

Vapor flow controller 2 sensing very low flow opens heat-input valve 3 fully. The propylene glycol-isophthalic acid mixture is heated to 185° C. where the esterification reaction begins and the mixture begins to boil. Vapor flow controller 2 will begin to regulate heat-input valve 3 to maintain the desired boil-up rate. The inert gas will be automatically shut off.

The propylene glycol and water of reaction vapors leaving the reactor enter the bottom of the distillation column and the column temperature begins to rise. The column vapor temperature controller 9 is set to maintain about 103° C. Temperature controller 9 will control the flow of water reflux by regulating reflux control valve 8. The water reflux will condense the higher boiling volatiles in the column and in so doing will be itself vaporized. The water vapors leaving the top of the distillation column are condensed. The water required for reflux is forwarded to the top of the distillation column. The condensed volatiles leave the column bottom and are returned to the reactor.

The batch temperature raises to approximately 200° C. during the pre-esterification of the isophthalic acid. During the entire pre-esterification reaction there is enough propylene glycol in the mass to maintain the boil-up rate desired. Therefore, combustion gases sparging of the mass to remove water of reaction is not required.

The reaction is carried on until an acid number of 50 or lower is attained. When the desired acid number is reached, the maleic anhydride is charged to the reaction mass. The free propylene glycol is quickly tied up in the esterification of the maleic anhydride and the vapor rate leaving the reactor will begin to diminish. The vapor flow controller 2 sensing the decrease in vapor flow will attempt to compensate by opening heat-input valve 3 fully. When valve 3 is fully open, the override on the vapor flow controller 2 will switch control from heat-input to reaction sphere to combustion gas addition to the reaction sphere by controlling gas sparge control valve 1. The control of heat-input valve 3 will be switched to reactor batch temperature controller 5. Temperature controller 5 set at 215° C. will maintain heat-input valve 3 fully open until the desired temperature is attained. Temperature controller 5 will then regulate heat-input valve 3 to hold this temperature.

Thus the reaction mass is maintained at the desired temperature while vapor flow controller 2 maintains the boil-up rate by regulating combustion gas sparge control valve 1 which controls the flow of combustion gases to the reaction kettle. The combustion gases are continuously sparged through the reaction mass and they strip off water of reaction as it is formed. The quantity of combustion gases fed to the reactor will increase as the amounts of volatile reactants and water of reaction decrease.

The combustion gases are sparged through the reaction mass until the polyester is at the desired specification of acid number below 65. Combustion gas sparge and water reflux to the column is then stopped. Reactor heat-input is shut off and the polyester is ready for further processing if required.

The above isophthalic polyester was made with a 5% molar excess of propylene glycol. The pre-esterification of isophthalic acid was accomplished in 5.5 hours and the final esterification in 5.5 hours for a total reaction cycle of 11 hours. Using ordinary inert gas methods a 10% molar excess of glycol would be required and a total reaction cycle of 24 hours needed; 14.4 hours for the pre-esterification and 9.6 hours for the final esterification.

*Example III*

This example will illustrate the concept of this invention as applied to the porcessing of an alkyd resin.

Into the resin kettle, there is charged 1015 parts of 98% glycerol, 2800 parts of linseed fatty acid and 1480 parts of phthalic anhydride. A low inert gas flow and agitation is started. The vapor flow controller 2 is set to maintain the desired boil-up rate and reactor temperature controller 5 is set for 260° C. The vapor flow controller 2 sensing a small vapor flow will open heat-input control valve 3 fully. The charge is heated to about 170° C. to 200° C. where the esterification reaction proceeds rapidly with evolution of copious amounts of water and volatile reactant vapors. Vapor flow controller 2 will regulate heat-input valve 3 to maintain the desired boil-up rate. When the reaction mass attains 200° C. to 215° C. most of the volatile reactants are combined and to maintain boil-up rate, heat-input valve 3 is fully opened by vapor flow controller 2. At this instant, the flow controller 2 override switches control to combustion gases sparge control valve 1 which regulates the flow of flue gases to be sparged through the reaction mass; and heat-input control is put on reactor temperature controller 5. The reactor temperature controller 5 set for 260° C. will keep heat-input valve 3 fully open until this temperature is reached and will then regulate valve 3 to maintain this temperature.

The vapors from the reactor are forwarded to the distillation column. The volatile reactants are condensed in the distillation column by coming into contact with the lower boiling water reflux. The rate of water reflux addition to the column is controlled by reflux control valve 8, actuated by column vapor temperature controller 9. The column temperature controller 9 is set to maintain a temperature of 103° C. The condensed volatile reactants are recycled back to the reaction sphere. The water vapors are taken overhead, condensed and refluxed back into the top of the distillation column as required.

The reaction mass is maintained at 260° C. and continuously sparged with combustion gases to remove water of reaction as it is formed, until the desired resin properties are reached. The sparge and reflux is discontinued when an acid number of less than 10 is attained with a Gardner-Holdt viscosity at U—X, measured at 25° C. as a 70% solids solution in mineral spirits. Heat-input to the reactor is shut off.

The above resin was made with an 8% molar excess of glycerol in a total reaction time for 10 hours. Using normal inert gas processing techniques an 18% molar excess of glycerol would be required with a reaction cycle time of 20 hours.

I claim:

1. A process for the preparation of a polyester resin comprising heating a polyhydric alcohol and a polycarboxylic acid to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillation column, condensing the unreacted reactants and returning the same to the reaction sphere without condensing the combustion product and water, removing the combustion product and water vapor from the top of the distillation column, continuing said heating of the reactants and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate decline at full heat, is maintained at about 30% to about 70% of the reactor content volume per minute, in cubic feet, by means of said sparge.

2. A process for the preparation of polyester resin comprising heating a polyhydric alcohol and a polycarboxylic acid to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillation column, condensing the unreacted reactants and returning the same to the reaction sphere without condensing the combustion product and water, removing the combustion product and water vapor from the top of the distillation column, condensing the water and separating said water from the combustion product and returning the water in liquid form to the top of the condenser so as to reflux the water down through the condenser, continuing said heating and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate declines at full heat, is maintained at about 30% to about 70% of the reactor content volume per minute, in cubic feet, by means of said sparge.

3. A process for the preparation of a polyester resin comprising heating a glycol and an alpha, beta-ethylenically unsaturated polycarboxylic acid to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillaiton column, condensing the unreacted reactants and returning the same to the reaction sphere without condensing the combustion product and water, removing the combustion product and water vapor from the top of said distillation column, condensing the water and separating said water from the combustion product and returning the water in liquid form to the top of said distillation column so as to reflux the water down through said distillation column, continuing said heating and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate decline at full heat, is maintained at about 30% to about 70% of the reactor content volume per minute, in cubic feet, by means of said sparge.

4. A process for the preparation of a polyester resin comprising heating a glycol and maleic anhydride to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillation column, condensing the unreacted reactants and returning the same to the reaction sphere without condensing the combustion product and water, removing the combustion product and water vapor from the top of said distillation column, condensing the water and separating said water from the combustion product and returning the water in liquid form to the top of said distillation column so as to reflux the water down through said distillation column, continuing said heating and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate decline at full heat, is maintained at about 30% to about 70% of the reactor content volume per minute, in cubic feet, by means of said sparge.

5. A process for the preparation of a polyester resin comprising heating a glycol and fumaric acid to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillation column, condensing the unreacted reactants and returning the same to the reaction sphere without condensing the combustion product and water, removing the combustion product and water vapor from the top of said distillation column, condensing the water and separating said water from the combustion product and returning the water in liquid form to the top of said distillation column so as to reflux the water down through said distillation column, continuing said heating and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate decline at full heat, is maintained at about 30% to about 70% of the reactor content volume per minute, in cubic feet, by means of said sparge.

6. A process for the preparation of a polyester resin comprising heating a glycol, an alpha, beta-ethylenically unsaturated dicarboxylic acid and a dicarboxylic acid free of nonbenzenoid unsaturation to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillation column, condensing the unreacted reactants and returning the same to the reaction sphere without condensing the combustion product and water, removing the combustion product and water vapor from the top of said distillation column, condensing the water and separating said water from the combustion product and returning the water in liquid form to the top of said distillation column so as to reflux the water down through said distillation column, continuing said heating and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate decline at full heat, is maintained at about 30% to about 70% of the reactor content volume per minute, in cubic feet, by means of said sparge.

7. A process for the preparation of a polyester resin comprising heating propylene glycol, maleic anhydride and phthalic anhydride to the esterification temperature and continuing said heating until the vapor rate, at full heat, begins to decline, thereupon, while continuing full heat, continually introducing a sparge of the inert gaseous combustion product of methane which is substantially free of molecular oxygen into the reaction vessel, below the liquid level of the reaction mixture, at a continuously controlled rate so as to prevent vapor rate decline, passing the combustion product together with water of esterification and unreacted reactants into a distillation column, condensing the unreacted reactants and returning the same to the reaction sphere without condensing the combustion product and water, removing the combustion product and water vapor from the top of said distillation column, condensing the water and separating said water from the combustion product and returning the water in liquid form to the top of said distillation column so as to reflux the water down through said distillation column, continuing said heating and vapor rate control until the acid number of the polyester resin is at least below 65, stopping said combustion product sparge and removing substantially all of said combustion product from the polyester resin product, wherein the vapor rate leaving the reaction mass, during the reaction cycle, beginning with vapor rate decline at full heat, is maintained at about 30% to about 70% of the reactor content volume per minute, in cubic feet, by means of said sparge.

References Cited in the file of this patent
UNITED STATES PATENTS

| | | |
|---|---|---|
| 2,595,625 | Agnew | May 6, 1952 |
| 2,892,813 | Georgian | June 30, 1959 |
| 2,961,430 | Davis | Nov. 22, 1960 |

UNITED STATES PATENT OFFICE
CERTIFICATE OF CORRECTION

Patent No. 3,127,377                                               March 31, 1964

Abraham Lindenauer

It is hereby certified that error appears in the above numbered patent requiring correction and that the said Letters Patent should read as corrected below.

Column 3, line 16, for "alkyl" read -- alkyd --; line 67, for "functionally" read -- functionality --; column 4, line 30, for "modified of" read -- modified or --; column 10, line 56, for "porcessing" read -- processing --; column 11, line 57, after "of" insert -- a --; column 12, line 8, for "clines" read -- cline --; line 23, for "distillaiton" read -- distillation --.

Signed and sealed this 21st day of July 1964.

(SEAL)

Attest:

ESTON G. JOHNSON
Attesting Officer

EDWARD J. BRENNER
Commissioner of Patents